(12) United States Patent
Cochran et al.

(10) Patent No.: US 7,080,397 B2
(45) Date of Patent: Jul. 18, 2006

(54) COMMUNICATION PROTOCOL FOR CONTENT ON DEMAND SYSTEM WITH CALLBACK TIME

(75) Inventors: Keith R. Cochran, San Diego, CA (US); John Okimoto, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 997 days.

(21) Appl. No.: 09/898,172

(22) Filed: Jul. 3, 2001

(65) Prior Publication Data

US 2002/0087971 A1 Jul. 4, 2002

Related U.S. Application Data

(60) Provisional application No. 60/263,087, filed on Jan. 18, 2001, provisional application No. 60/243,925, filed on Oct. 26, 2000.

(51) Int. Cl.
*H04N 7/173* (2006.01)
(52) U.S. Cl. ............................ 725/87; 725/31; 380/200
(58) Field of Classification Search ............... 380/205, 380/210, 211
See application file for complete search history.

(56) References Cited

U.S. PATENT DOCUMENTS 5,870,474 A * 2/1999 Wasilewski et al. ........ 380/211

| | | | |
|---|---|---|---|
| 6,256,393 B1 * | 7/2001 | Safadi et al. | 380/232 |
| 6,415,031 B1 * | 7/2002 | Colligan et al. | 380/200 |
| 6,681,326 B1 * | 1/2004 | Son et al. | 713/150 |
| 2003/0140340 A1 * | 7/2003 | Bertram | 725/29 |

FOREIGN PATENT DOCUMENTS

| WO | WO 98/43426 A | 10/1998 |
|---|---|---|
| WO | WO 00/67483 A | 11/2000 |
| WO | WO 00/79365 | 12/2000 |

* cited by examiner

*Primary Examiner*—Vivek Srivastava
*Assistant Examiner*—Jade O. Laye
(74) *Attorney, Agent, or Firm*—Townsend and Townsend and Crew LLP

(57) ABSTRACT

A transaction protocol for communicating between an encryption renewal system communicably coupled to one or more video on demand systems via a communication network. The encryption renewal system permits pre-encrypted content to be accessed by clients of the video on demand systems. The protocol comprises, receiving, by the encryption renewal system, a request transaction document having a first format from the video on demand system; parsing the request transaction document to retrieve data from the request transaction document; generating a request object code in a second format for processing by encryption renewal system, the request object code based on the data in the request transaction document; responsive to processing of the request object code, generating a response object code having the second format; converting the response object code to a response transaction document having the first format; and forwarding the response transaction document to the video on demand system.

16 Claims, 2 Drawing Sheets

COMMUNICATION PROTOCOL FOR CONTENT ON DEMAND SYSTEM WITH CALLBACK TIME

CROSS-REFERENCES TO RELATED APPLICATIONS

This application claims priority from U.S. Provisional Application No. 60/243,925, entitled "SYSTEM FOR CONTENT DELIVERY OVER A COMPUTER NETWORK," filed on Oct. 26, 2000 and U.S. Provisional Application 60/263,087, entitled "SYSTEM FOR SECURELY DELIVERING ENCRYPTED CONTENT ON DEMAND WITH ACCESS CONTROL," filed Jan. 18, 2001. These applications are incorporated herein by reference for all purposes. This application is also related to the following U.S. Non provisional applications, U.S. patent application Ser. No. 08/420,710, now U.S. Pat. No. 5,627,892, entitled "DATA SECURITY SCHEME FOR POINT-TO-POINT COMMUNICATION SESSIONS," filed Apr. 19, 1995; U.S. patent application Ser. No. 09/898,136, entitled "SYSTEM FOR DENYING ACCESS TO CONTENT GENERATED BY A COMPROMISED OFF LINE ENCRYPTION DEVICE AND FOR CONVEYING PERIODICAL KEYS FROM MULTIPLE CONDITIONAL ACCESS SYSTEMS," filed Jul. 3, 2001; U.S. application Ser. No. 09/898,168, entitled "SYSTEM FOR SECURING ENCRYPTION RENEWAL DEVICE AND FOR REGISTRATION AND REMOTE ACTIVATION OF ENCRYPTION DEVICE," filed Jul. 3, 2001; U.S. patent application Ser. No. 1 09/898,184, entitled "SYSTEM FOR SECURELY DELIVERING PRE-ENCRYPTED CONTENT ON DEMAND WITH ACCESS CONTROL," filed Jul. 3, 2001, all of which are hereby incorporated by reference in their entirety as if set forth in full in the present invention, for all purposes.

BACKGROUND OF THE INVENTION

The present invention relates generally to the field of content communication and more specifically to a system for communicating video content on demand through a communication network having a communication protocol with callback time.

Conventional systems for delivering video content on demand to subscribers are becoming well known. VOD (video on demand) is an interactive service in which content (e.g., video) is delivered to a subscriber over a point-to-point network (e.g., a cable system) on an on demand basis. A subscriber may order and receive programming content at any time, without adhering to a predefined showing schedule. The subscriber is often provided VCR-like motion control functions, such as pause (freeze frame), slow motion, scan forward, and slow backward. The subscriber is typically allowed multiple views of a purchased program within a time window, e.g., 24 hours. VOD mimics (or exceeds) the level of control and convenience of rental video tapes.

Entitlement Management Messages

EMMs (Entitlement Management Messages) are control messages that convey access privileges to subscriber terminals. Unlike ECMs (Entitlement Control Messages) (discussed below) which are embedded in transport multiplexes and are broadcast to multiple subscribers, EMMs are sent unicast-addressed to each subscriber terminal. That is, an EMM is specific to a particular subscriber. In a typical implementation, an EMM contains information about the periodical key, as well as information that allows a subscriber terminal to access an ECM which is sent later. EMMs also define the tiers for each subscriber. With reference to cable services, for example, a first EMM may allow access to HBO™, ESPN™ and CNN™. A second EMM may allow access to ESPN™, TNN™ and BET™, etc.

Entitlement Control Messages

In a conditional access system, each content stream is associated with a stream of ECMs (entitlement control messages) that serve two basic functions: (1) to specify the access requirements for the associated content stream (i.e., what privileges are required for access for particular programs); and (2) to convey the information needed by subscriber terminals to compute the periodical key(s), which are needed for content decryption. ECMs are transmitted in-band alongside their associated content streams. Typically, ECMs are cryptographically protected by a "periodical key" which changes periodically, usually on a monthly basis. The monthly key is typically distributed by EMMs prior to the ECMs, as noted above.

Encryption

In a cable system, carrier signals are broadcast to a population of subscriber terminals (also known as set-top boxes). To prevent unauthorized access to service, encryption is often employed. When content is encrypted, it becomes unintelligible to persons or devices that don't possess the proper periodical key(s).

Disadvantageously, for VOD, real-time encryption poses much greater cost and space issues. A medium-sized cable system may have, for example, 50,000 subscribers. Using a common estimate of 10% peak simultaneous usage, there can be up to 5000 simultaneous VOD sessions during the peak hours. A typical encryption device can process a small number of transport multiplexes (digital carriers). Over 300 such real-time encryption devices will be needed to handle the peak usage in the example system. Such a large amount of equipment not only adds significantly to the system cost, but also poses a space requirement challenge.

One solution to the aforementioned problem is disclosed in co-pending related U.S. patent application Ser. No. 09/898,184 entitled SYSTEM FOR SECURELY DELIVERING PRE-ENCRYPTED CONTENT ON DEMAND WITH ACCESS CONTROL, filed Jul. 3, 2001, which is hereby incorporated by reference in its entirety. In U.S. patent application Ser. No. 09/898,184, a system is disclosed that encrypts content offline (typically before the content is requested by the user) before it is distributed to point-to-point systems such as cable systems. The system allows content to be encrypted once, at a centralized facility, and to be useable at different point-to-point systems. Advantageously, the pre-encrypted contents in the present invention have indefinite lifetimes. The system periodically performs an operation called ECM retrofitting, enabling the content to be useable in multiple systems and useable multiple times in the same system. The amount of data being processed during ECM retrofitting is very small (on the order of several thousand bytes). There is no need to reprocess the pre-encrypted contents. This is a significant advantage, as several thousand bytes represent only a tiny fraction of the size of a typical 2-hour video program, which is about 3 gigabytes (3,000,000,000 bytes) in size.

A first aspect of U.S. patent application Ser. No. 09/898, 184 system includes a content preparation system (CPS) for pre-encrypting the content offline to form pre-encrypted content; an encryption renewal system (ERS 104) for generating entitlement control messages (ECMs) that allow the pre-encrypted content to be decryptable for a designated duration; and a conditional access system (CAS). Conventionally, the CAS controls a population of set-top boxes using a randomly generated category key. Only with possession of the category key can the pre-encrypted content be decrypted by the set-top boxes. The category key is initially forwarded to the ERS 104 which thereafter generates an ECM containing information regarding the category key. The process or requesting and generating ECMs for pre-encrypted content is known as ECM retrofitting.

After a VOD system receives pre-encrypted content and an associated encryption record, the system must receive appropriate retrofitted ECMs from the ERS 104 before the content is offered to consumers. The ECMs enable the pre-encrypted content to be decrypted. In this fashion, the ERS 104 can be connected to multiple VOD systems for which ECM retrofitting is performed. However, in order. to perform ECM retrofitting, the VOD systems must submit a request to the ERS 104. Disadvantageously, without such a mechanism, it would be relatively difficult to initiate ECM retrofitting for the pre-encrypted content. Another disadvantage of U.S. patent application Ser. No. 09/898,184, is that in some instances, each VOD server may employ a protocol version different or incompatible with the ERS 104 system version. In such cases, it necessary to employ a system allowing interoperability between all of the system components. A further disadvantage relates to the fact that ERS 104 is connectable to multiple VOD systems. Consequently, ERS 104 may become overwhelmed with multiple simultaneous requests, since the VOD systems must contact ERS 104 for the retrofitted ECMs.

Therefore, there is a need to resolve the aforementioned disadvantages and the present invention meets this need.

SUMMARY OF THE INVENTION

A first aspect of the present invention is a communication protocol for a content on demand system with callback time. The protocol which is partly based on XML (extensible markup language) permits transactions between an ERS (encryption renewal system) and one or more video on demand (VOD) systems. After receiving pre-encrypted content and an associated encryption record, a VOD system must receive appropriate retrofitted ECMs from the ERS before the content is offered to consumers. The ECMs enable clients of the VOD system to access the pre-encrypted content. To initiate retrofitting and transmit the ECMs, the VOD system employs the present invention to communicate with the ERS which also responds using the present communication protocol. Furthermore, a callback time specifying when the VOD system should contact the ERS is included in the response to the VOD system.

The communication protocol includes the steps of receiving, by the encryption renewal system, a request transaction document having a first format from the video on demand system. In one aspect, the first format is XML, a publicly available meta mark-up language. The protocol further includes parsing the request transaction document to retrieve data from the request transaction document; and generating an object request code in a second format for processing by encryption renewal system, the object request code based on the data in the request transaction document. In a further aspect, the second format is in Java™, a product of Sun Microsystems, San Jose, Calif.

Responsive to processing of the request object code, other steps include generating a response object code having the second format; converting the response object code to a response transaction document having the first format; and forwarding the response transaction document to the video on demand system.

According to another aspect of the present invention, the request transaction document contains an encryption record, a data structure having one or more periodical keys for accessing the pre-encrypted content.

According to another aspect of the present invention, the protocol includes the step of parsing the request transaction document to determine a protocol version of the request transaction document, wherein the request object code is partly based on the protocol version.

According to another aspect of the present invention, the request transaction document is a request to retrofit an entitlement control message for permitting clients of the video on demand system to access the pre-encrypted content.

According to another aspect of the present invention, the response transaction document is a response to the request to retrofit the entitlement control message.

According to another aspect of the present invention, in a communication system having an encryption renewal system coupled to one or more on demand servers, a method by the encryption renewal system for allowing the on demand server to callback the encryption renewal system is disclosed. The method includes receiving a first request to retrofit an entitlement control message; retrofitting the entitlement control message to allow access to pre-encrypted content; and generating a first response having the entitlement control message which is retrofitted, wherein the response further comprises a first callback time specifying a time for the video on demand system to contact the encryption renewal system.

According to another aspect of the present invention, the method consists of receiving a second request to retrofit prior to the first callback time; and generating a response having a second callback time that invalidates the first callback time.

Advantageously, the present invention is flexible, and is supported using Internet based open standards solutions such as XML, XML Schemas or DTD (document type definition), XML Parsers, XML document builders, and w3c DOM (document object model) all freely available for use. Furthermore, using the callback mechanism, VOD system clients are kept updated, if the clients callback as scheduled, thus avoiding loss of service due to outdated ECMs.

Figure 1:
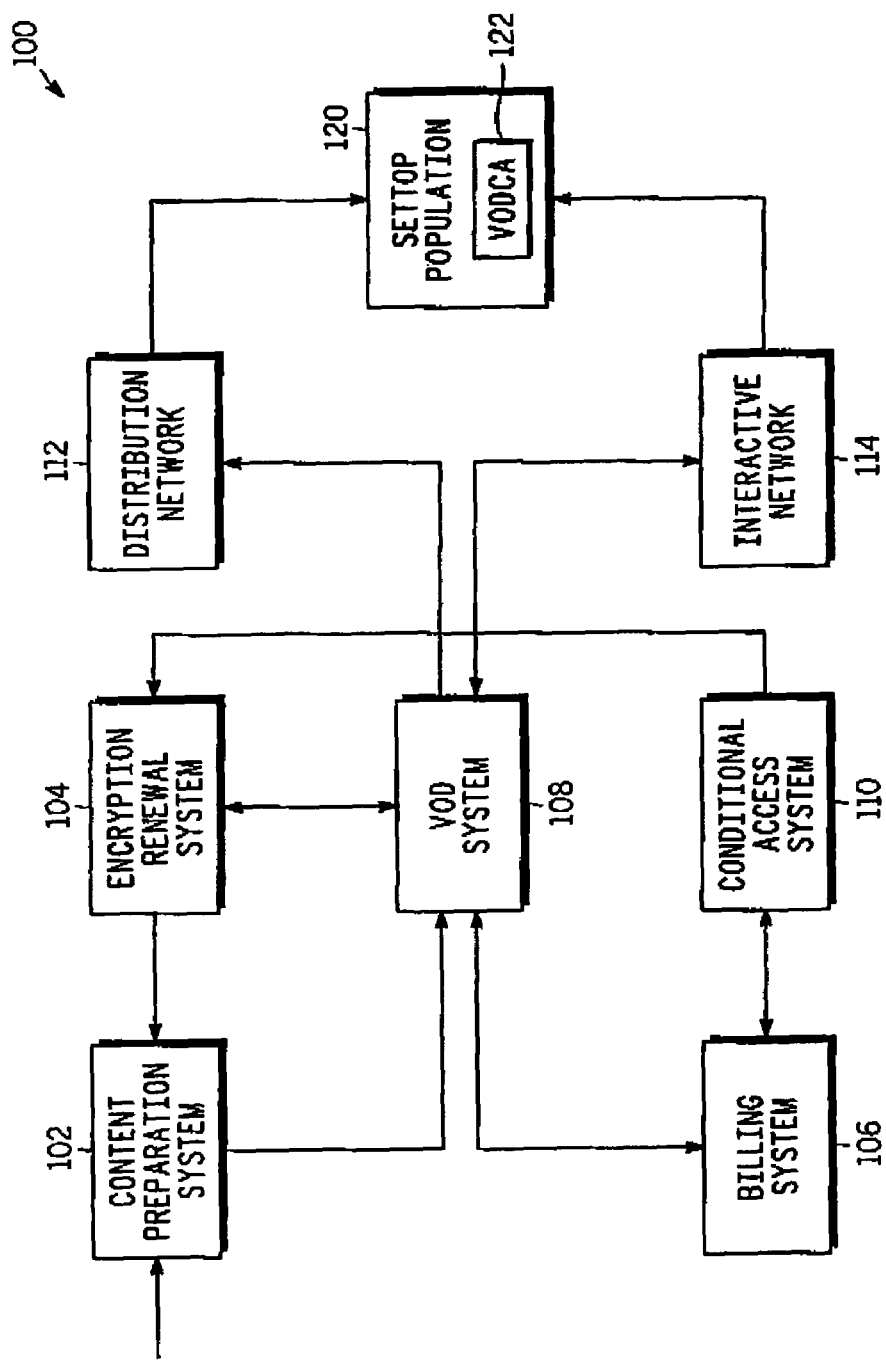
FIG. 1 shows a system architecture for delivering encrypted content to a subscriber in accordance with a first embodiment of the present invention.

A further understanding of the nature and advantages of the present invention herein may be realized by reference to the remaining portions of the specification and the attached drawings. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

According to first aspect, the present invention is a communication protocol for a content on demand system with callback time. The protocol which is partly based on XML (extensible markup language) permits transactions between an ERS (encryption renewal system) and one or more video on demand (VOD) systems. After receiving pre-encrypted content and an associated encryption record, a VOD system must receive appropriate retrofitted ECMs from the ERS before the content is offered to consumers. The ECMs enable clients of the VOD system to access the pre-encrypted content. To initiate retrofitting and transmit the ECMs, the VOD system employs the present invention to communicate with the ERS which also responds using the present communication protocol. Furthermore, a callback time specifying when the VOD system should contact the ERS is included in the response to the VOD system.

The communication protocol includes the steps of receiving, by the encryption renewal system, a request transaction document having a first format from the video on demand system. In one aspect, the first format is XML, a publicly available meta mark-up language. The protocol further includes parsing the request transaction document to retrieve data from the request transaction document; and generating an object request code in a second format for processing by encryption renewal system, the object request code based on the data in the request transaction document. In a further aspect, the second format is in Java™, a product of Sun Microsystems, San Jose, Calif.

Responsive to processing of the request object code, other steps include generating a response object code having the second format; converting the response object code to a response transaction document having the first format; and forwarding the response transaction document to the video on demand system.

FIG. 1 is a system architecture 100 for delivering encrypted content to a subscriber in accordance with a first embodiment of the present invention.

Among other components, system architecture 100 comprises a content preparation system (CPS) 102 for pre-encrypting content, video on demand (VOD) system 108 storing encrypted programs for distribution to subscribers on an on demand basis, conditional access system 110 for controlling one or more keys granting access to pre-encrypted content, an encryption renewal system 104 ERS 104 accepting requests from the video on demand system to generate new entitlement control messages for pre-encrypted content, a distribution network 112 for distributing content, and an interactive network 114 providing two-way interaction between the subscriber and the content system. Although not shown, one of ordinary skill in the art would realize that other components and arrangement for achieving the various functionalities of system architecture 100 are possible. For example, VOD system may be coupled directly to CAS 110 and functionalities consolidated in both components since both components are typically located within a cable system head end.

In operation, the VOD system 108 is installed to provide VOD to subscribers. Before going live, VOD system 108 goes through a registration process with the ERS 104. This establishes the identity of the VOD system 108 to the ERS 104 so it can produce proper and appropriate responses specific to that VOD system installation. Once VOD system 108 registration is complete, content may be added to VOD system 108 and made available to subscribers. Clear content (a), such as a movie, originates from a content provider and begins its entry to the VOD at CPS 102. Here, the clear content is encrypted using an Off Line Encryption System (OLES) (not shown), which pre-encrypts the content in preparation for delivery by VOD system 108. The OLES also generates an encryption record associated with the encrypted content. Note that VOD system 108 may keep the encryption record with the pre-encrypted content at all times as it identifies the content for later processing and decryption within VOD system 108.

Once the clear content is encrypted at the OLES, the resulting pre-encrypted content and associated encryption record are delivered to VOD system 108 for storage on the local server. Advantageously, multiple VOD systems may be coupled to CPS 102 such that content is encrypted once and distributed to the systems. VOD system 108 is responsible for keeping the pre-encrypted content and associated encryption record together. Before the pre-encrypted content may be requested or viewed by subscribers in their homes, VOD system 108 obtains suitable Entitlement Control Messages (ECMs) from the ERS 104. VOD system 108 submits an ECM request to ERS 104, containing the encryption record (c) for the desired pre-encrypted content.

ERS 104 responds with the proper ECMs, an ERS 104 synchronization number, and a callback time. The ECMs are created specifically for the particular pre-encrypted content and particular point-to-point system within which VOD system 108 operates, and for a particular time period. The ECMs encrypt content using a key (typically periodical) provided by each conditional access system (CAS 110 in the present case) controlling the set-top boxes. VOD system (108) inserts the received ECMs into the streams along with the pre-encrypted content whenever it is spooled out to a subscriber. The ECMs are inserted into the streams with the content.

It should be observed that ECMs returned to VOD system 108 by ERS 104 are valid and usable with the pre-encrypted content only for a limited time—the exact time, determined by CAS 110, is not predictable in advance. Thus, the callback time returned with the ECMs indicates the time by which VOD system 108 should check with the ERS 104 to see if ECMs for all pre-encrypted content may be updated. When VOD system 108 receives the callback time it should be stored and tracked against the current time. If the callback time is reached and the VOD system 108 has not contacted ERS 104 in the intervening time, then VOD system 108 attempts to contact the ERS 104 even if it has no new ECM requests to fulfill.

Content Preparation System (CPS)

In FIG. 1, content preparation system (CPS) 102 is a centralized facility for preparing contents according to the requirements of the VOD system (VOD) 108 and those of the Conditional Access system (CAS) 110. CPS 102 encodes content in a format (e.g., MPEG-2) suitable for storage on video servers and for distribution to the subscriber terminals. For content that is already available in the suitable format, this encoding step may be unnecessary. CPS 102 also functions to encrypt digitally encoded content according to the specifications of CAS 110.

The encryption process involves generating one or a series of periodical keys. As part of the encryption process, the periodical keys, or the parameters used in their generation, are saved in a data structure called an encryption record. The encryption is protected by encryption to prevent unauthorized access to the keys. CPS 102 may package encrypted programs with the associated encryption records, which may additionally contain useful but nonessential information about the content. Such information may include program title, identification of the program assigned by different parties, encoding parameters, program length, etc. CPS 102 may serve multiple cable systems or multiple point-to-point systems. The content preparation process described above produces encoded and encrypted content ready for distribution to VOD systems across a diverse geographic area. Some potential methods of content file distribution are via physical media, network file transfer, or satellite file transfer.

Although not shown, CPS 102 includes an OLES (off line encryption) device for performing the aforementioned functionality. The OLES uses one or more non-real-time, or offline, encryption devices to encrypt content. A given OLES generates program-specific periodical keys that are used to encrypt content. The OLES is protected by physical security including physical access control and secure packaging. The OLES includes functions such as accepting encryption control provisioning parameters from the ERS 104 including cryptographic information to support content encryption; selecting one or more periodical keys based on the encryption control parameters and system configuration which keys are used for encrypting the program content; generating an encryption record, which contains information about the keys used to encrypt the content. This record itself is encrypted to maintain the security of the encryption record; encrypting the program content using the chosen keys; and providing the encrypted content and the encryption record to the CPS, for subsequent transfer to at least one VODS.

Typically, an OLES is registered and authorized by the ERS 104 prior to having ability to perform encryption operations. ERS 104 provides a removable disk containing authorization and configuration parameters for the OLES such data being processed during initial setup. As noted, as part of the encryption process, the periodical keys or the parameters used in their generation, are saved by the OLES in a data structure called an encryption record. The OLES is capable of processing an MPEG content in an off-line manner whereby the raw content has been completely encoded and is obtainable from a server (VOD or other server) or has been placed onto the OLES system. One of ordinary skill will realize that the above guidelines are exemplary and other embodiments having different guidelines are possible.

Video On Demand System (VOD system)

VOD system 108 comprises one or more video servers adapted for video on demand applications. The servers store encrypted programs for distribution to subscribers on an on demand basis. Thereafter, the pre-encrypted programs are routed and streamed to the authorized subscribers. In addition, VOD system 108 accepts purchase requests from subscriber terminals, and validates and authorizes such purchase requests as appropriate. In some instances, after a purchase request is approved, the VOD purchases may be temporarily stored until requested by the subscriber.

VOD systems generally are well known in the art and need not be described in detail.

Conditional Access System (CAS)

As noted, content system 100 includes a conditional access system (CAS) 110. CAS 110 permits access to pre-encrypted content by subscriber terminals by provisioning them with EMMs, and generating ECMs for non-VOD services. Other functions of CAS 110 include controlling real-time encryption devices in the cable system; reporting the (scheduled) occurrence of monthly key changes to the encryption renewal system (described below), and transmitting cable system-specific cryptographic parameters (e.g., monthly keys) to the encryption renewal system to enable ECM retrofitting. CAS systems are well known in the art and may comprise off the shelf items. In addition, one of ordinary skill in the art such as a programmer can develop code as may be necessary to accommodate the present invention.

Billing System (BS)

BS 106 interfaces with both VOD system 108 and CAS 110 to provide the following functions: (1) accepting subscription and service change requests from subscribers; (2) maintaining subscriber account information; (3) billing subscribers; (4) interfacing with VOD system 108 to provide the latter with subscriber authorization status, and to collect video on demand purchase information from the latter; and (5) providing subscriber authorization status, service and event definition information, and to collecting purchase information.

Encryption Renewal System (ERS 104)

As shown in FIG. 1, ERS 104 interfaces with CPS 102, VOD system 108 and CAS 110. ERS 104 enables pre-encrypted content to be distributed to VOD system 108 and other authorized VOD system entities while enabling access control within each CAS 110. The ERS 104 performs ECM renewal (ECM retrofitting) in synchronization with category epoch rollover events occurring within each participating CAS 110. A category epoch is the nominal period during which a category key used by CAS 110 to protect the distribution of program keys is in effect.

Encrypted content from the CPS is unusable until an initial ECM "renewal" operation is performed. To make the content usable for the first time, VOD system 108 contacts ERS 104 to obtain the first set of ECMs. Henceforth, ECM renewal is performed periodically to keep valid ECMs associated with each content title on VOD system 108. ERS 104 functions include: generating encryption control parameters for initializing OLES devices, communicating with the CAS in different point to point systems, accepting requests from a VOD system to generate ECMs for pre-encrypted content, computing retrofitted ECMs, sending retrofitted ECMs to the requesting VODS, and maintaining databases of appropriate parameters. ERS 104 may also interface with VOD system 108 to forward information about (scheduled) monthly key changes to VOD system 108.

ERS 104 is implementable using hardware, software or a combination of both. For example, a number of coding languages such as Java™ or servers like Apache Group's Apache™ and operating environments such as Windows NT™ may be employed in the present invention.

Distribution Network

Distribution Network 112 is a network that distributes signals to all or a subset of the subscribers in the system. Distribution Network 112 may comprise hybrid fiber-coax (HFC) technology, for example. In an HFC network, for example, broadcast signals are distributed from the head end (central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables. At some level of distribution facility (hub, fiber node, or other distribution facilities), video on demand carriers are broadcast to a subset of the subscriber terminal population served by the distribution facility. This typically occurs at the fiber node level. This arrangement allows the reuse of video on demand carrier frequencies, say across fiber nodes, because different fiber nodes broadcast different video on demand carriers to the subscribers they serve.

Interactive Network

Interactive network 114 is communicably coupled to VOD system 108 and set top population 120 to provide a two-way communication capability between the subscriber terminals and the VOD system 108. Interactive Network 114 may share some of the physical infrastructure of Distribution Network 112.

Renewing ECMs

ECM retrofitting is the process of generating ECMs for pre-encrypted contents so that they are useable in different cable systems and despite monthly key changes. It is performed by a server hosted in ERS 104, which is a secure environment. Content is encrypted prior to a request from a subscriber terminal. ERS 104 provisions the offline encryption devices in CPS 102 with encryption control parameters, which, among other functions, enable ERS 104 to retrieve information from encryption records generated by the CPS. This provisioning need be done only infrequently, or possibly just once. It need not be done with every ECM retrofitting request from the VOD system 108.

Next, an encryption record of parameters for encrypting the content is generated. VOD system 108 establishes a secured connection to ERS 104. The communication protocol for establishing the secured connection is described below. To make a pre-encrypted program usable in a particular system for a particular period, VOD system 108 sends the encryption record to ERS 104 which checks the authorization status of the requested content from VOD system 108. If the authorization check fails, ERS 104 terminates the session. Otherwise, the process continues. ERS 104 generates one or more ECMs for the pre-encrypted program using the monthly key associated with the cable system (and possibly other parameters required by the CAS). The ECM(s) are created in such a way that they will be valid until the monthly key of the target system changes again. ERS 104 sends the retrofitted ECM(s) and pre-encrypted content to the subscriber via VOD system 108.

Figure 2A:
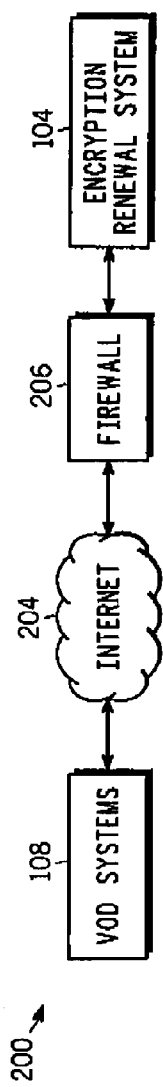
FIG. 2A is a block diagram of a network having one or more VOD systems and an encryption renewal system for the purpose of illustrating XML transaction flow between both components.

FIG. 2A is a block diagram of a network 200 for illustrating XML transaction flow between one or more VOD systems 108 and ERS 104. As shown, communication between VOD system 108 and ERS 104 is via the Internet 204 and a firewall 206. To request ECM retrofitting, VOD system 108 prepares and forwards an XML document to ERS 104 which is responsible for generating the appropriate ECMs, as further described with reference to FIG. 2B.

Figure 2B:
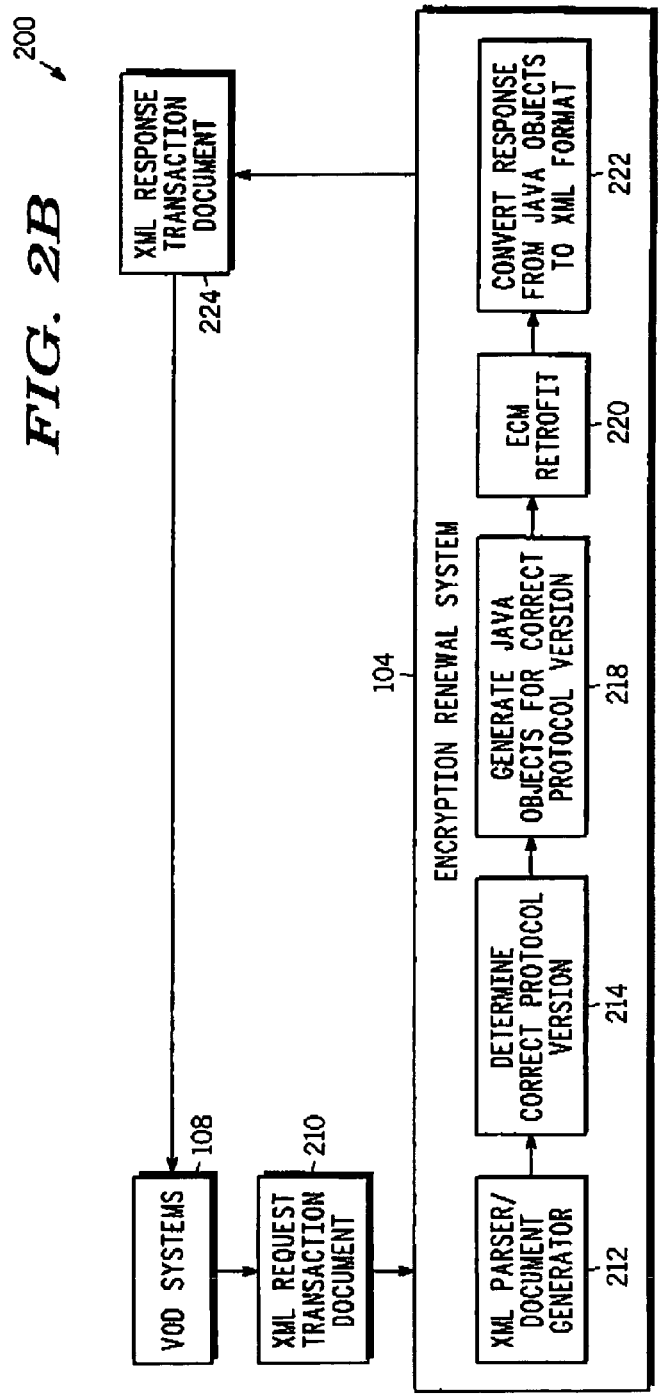
FIG. 2B is a block diagram of network of FIG. 2A depicting the logical flow of data between VOD system and ERS.

FIG. 2B is a block diagram of network 200 of FIG. 2A depicting the internal data between VOD system 108 and ERS 104. As shown, at block 210, a request transaction document having a first format is generated and forwarded to ERS 104.

Preferably, the first format is XML, although one of ordinary skill in the art will realize that other formats consistent with the spirit and scope of the present invention may be employed. XML is a meta-language for defining other structural languages such as HTML (Hypertext markup language) for example. Further, XML uses a DTD or schema to constrain the definition of the protocol between VOD system 108 and ERS 104. In essence, XML permits the definition of a baseline grammar for describing transaction requests from VOD system 108 to the ERS 104 and transaction responses from the ERS 104 to VOD systems. Advantageously, off-the-shelf XML parsers (block 212) used by applications for understanding the protocol grammar are employed.

At block 212, the request transaction document is parsed using an XML parser/document generator.

At block 214, parsing results in determining the protocol version employed by VOD system 108. As used herein, a parser is a program, frequently part of a compiler, that receives input in the form of sequential source program instructions, interactive online commands, markup tags, or some other defined interface and breaks them up into parts (for example, the nouns (objects), verbs (methods), and their attributes or options) that can then be managed by other programming (for example, other components in a compiler).

It should be noted that the protocol supports multiple simultaneous versions. The version of the protocol is indicated within an XML document by a <VerX.X> tag (see example below), where X.X is the protocol version currently supported and assigned to a particular VOD System to use. Although not always the case, the <VerX.X> is typically the first child element of ERSPayload. The XML Schema contains the current <VerX.X> or <VerX> tag to support the latest protocol version as well as previous <VerX.X> tags for backward compatibility. The version indicated by X.X can take any form for subsequent protocol versions.

When the request transaction document is parsed, various data are retrieved in addition to obtaining the protocol version. For example, the request transaction document contains an ECMRequest element containing encryption record data for the pre-encrypted content. The ECMRequest element consists of a single element called EncryptionRecord, containing such pertinent data as the pre-encrypted content title, encryption time, off line encryption device, etc.

At block 218, a request object code having a second format and corresponding to the determined protocol version (and data) is generated. Preferably, the second format is Java™ although one of ordinary skill in the art will realize that other formats within the spirit and scope of the present invention are applicable.

At block 220, the request object code is processed and a corresponding response object code having the second format is generated. The response object code generated depends on the transaction requested by VOD system 108. For example, if ECM retrofitting is requested, the response object code appropriate for ECM retrofitting is generated.

At block 222, the response object code is converted to a response transaction document having the first format (e.g. XML) as shown at block 224, and forwarded to VOD system 108 as shown at block 224. Among other data, the response transaction document contains a callback time, specifying a time for the video on demand system to contact the encryption renewal system.

In this manner, the present invention facilitates communication between one or more video on demand systems coupled to an encryption renewal system. This is particularly the case when the transaction concerns ECM requests and responses. Advantageously, the present invention is flexible, and is supported using Internet based open standards solutions such as XML, XML, DTDs or Schemas, XML Parsers, XML document builders, and w3c DOM (document object model) SAX all freely available for use. Furthermore, using the callback mechanism, VOD system clients are kept updated, if the clients callback as scheduled, thus avoiding loss of service due to outdated ECMs.

The Callback Time Mechanism and the ERS Synchronization Number

All valid ERS Transaction Responses to the VOD System contain a Callback Time specified in Coordinated Universal Time (UTC) which is a standard XML & ISO time format. The format for UTC will be the following:

CCYY-MM-DDThh:mm:ssZ

"CC" represents the century, "YY" the year, "MM" the month and "DD" the day. The letter "T" is the date/time separator and "hh", "mm", "ss" represent hour, minute and second respectively. The format for time must be specified using Coordinated Universal Time (UTC). A "Z" will immediately follow this representation to indicate Coordinated Universal Time without time zone adjustment. The Callback Time indicates the next time by which VOD System 108 should contact the ERS 104. In other words—if the Callback Time passes before VOD System 108 sends an ERSPayload transaction request to ERS 104, then VOD System 108 is required to send a request to ERS 104.

In normal operation, new content will be added to VOD System 108 at regular intervals; thus, VOD System 108 sends ECM Requests to ERS 104 at regular intervals as well. If VOD System 108 sends an ECM Request to ERS 104 before the previous Callback Time was reached, then a new Callback Time will be received in the ERSPayload transaction response. This new Callback Time invalidates the previous Callback Time. However, if no new content is added to the VOD System and the last received Callback Time is reached, then the VOD System is required to contact the ERS.

In this case, VOD System 108 requests the ERS Synchronization Number using ERSPayload with only the Sender element included, as there is no need to do an ECM Request. The ERSPayload transaction response sent by ERS 104 contains a new Callback Time for VOD System 108, and the current ERS Synchronization Number, the latter indicating the lifetime of ECMs. Hence, the implication is that VOD system 108 need not call ERS 104 unless it has specific requests to fulfill. The scheduling of the Callback Time provided to VODS clients by the ERS is done at the time of the VODS request, and is managed dynamically. This allows both the callback schedules and loading to be changed at any time.

Use of HTTP POST

ERS 104 protocol messages are valid XML documents, with a single ERSPayload root element and a structured hierarchy of tags describing the possible operations and data. An XML document is enclosed using elements or tags. A root or child element is the opening and closing tags in which all other elements are enclosed. As noted below, every logical operation begins with VOD system 108 sending an ECM request specified using an ECMRequest XML element. More information regarding version 1.1 of the HTTP protocol may be obtained by referring to RFC (Request for Comments) 2616.

To send an ERSPayload/HTTP request, VOD system 108 performs an HTTP POST to a well-known URL associated with ERS 104. Every logical operation begins with VOD system 108 sending a request. ECM requests are specified using an ECMRequest XML element, and ECM responses are specified using an ECMResponse element. For ERSPayload/HTTP, the ECMRequest is typically sent in an HTTP post, and the ECM response to that request is typically sent in the HTTP Response to that POST. Thus, ECM Request/Response pairs always map directly to HTTP POST/Response pairs. The following is a pseudo-code representation of the protocol to illustrate where the use of the HTTP POST would occur. An ERSPayload for both request and response corresponds to a single HTTP POST/Response transport level transaction.

(1) VODS ERS (HTTP POST):

```
<ERSPayload>
    <Ver1.0>
        ...
        <ECMRequest> Contents of request... </ECMRequest>
        ...
    </Ver1.0>
</ERSPayload>
(2) VODS ERS (HTTP Response to the POST):
<ERSPayload>
    <Ver1.0>
        ...
        <ECMResponse> Contents of ECM information... </ECMResponse>
        ...
    </Ver1.0>
</ERSPayload>
```

The ERS 104/VODS interface protocol allows multiple requests or responses to be sent in a single payload message. This allows round trips to be minimized whenever possible. For example, a VOD system with eight titles to be retrofitted can send all eight ECM requests and receive all eight ECM responses in a single HTTP POST/Response communication. The following is sample HTTP syntax that may be used to communicate XML transactions from VOD system 108 to the ERS 104:

```
POST /VODSTransaction HTTP/1.1
Host:ERS.COM
Authorization:Basic dm9kczpwYXNzd28yZA==
From: admin@vodsys1.vodcompany.com
Content-Type: application/x-www-form-urlencoded
Content-Length: 30
xmldata=ValidXMLDocument
```

VOD System/ERS 104 Interface Protocol Specification

The tables in the following subsections represent the protocol transactions that flow between the ERS 104 and one or more VOD Systems 108. Element tables have five columns and attribute tables. An attribute is a characteristic of an element that can be changed. The attribute tables have four columns that use some combination of the following column headings: Element Name: represents the name of the field or XML element pair. For instance, if the Element Name specified were "ERSPayload", then the corresponding XML element pair would be "<ERSPayload> </ERSPayload>" (or the shorter form for the pair, "<ERSPayload/>"). Attribute Name: represents the name of the XML attribute that is associated with the specified element. For instance, if the element specified was "ERSPayload" and if the Attribute Name were "payloadId", then the corresponding XML would be written as "<ERSPayload payloadId=" 12312"> </ERSPayload>".

Direction Flow: indicates the direction flow of transaction data between sender and receiver. The transaction data is the most meaningful for the recipient, even though the protocol may require the element or attribute to be present in either direction of transaction flow. The XML elements or attributes from VOD system 108 to the ERS 104 that are required to be sent are indicated as VODS→ERS. Elements or attributes from the ERS 104 to VOD system 108 that are required to be sent are indicated as ERS→VODS. Element or attributes information required in either direction is indicated as: VODS ↔ERS. Required?: indicates whether the current XML element or attribute is required to be present in its current context. The root element, ERSPayload, envelops all transactions that flow between the ERS 104 and VOD Systems. The ERSPayload element may be required when delivering transactions to the ERS 104 from VOD Systems and when delivering responses from the ERS 104 to VOD Systems.

Other columns are, Element Value: This column indicates a type and/or value (or a range of values) that are associated with Element Name or Attribute Name. In some cases there may only be a note that indicates how Element Name or Attribute Name can be used. In other cases, "None" will be the designation when there are no values associated with Element Name or Attribute Name. Nested Elements?: this column heading only applies to Element Name when Element Name contains other nested elements. Nested elements for the protocol specification are given by the XML schema definition.

The element names of the embodiment shown in the tables represent the XML elements that would be used to construct a well-formed XML document. A well-formed document is one created following certain XML rules. Otherwise, the document is useless. A completed XML document represents one transaction message. The Ver1.0 element under the ERSPayload element sent from VOD Systems to the ERS 104 may contain eight or more ECM requests and an implicit query for the next ERS 104 Synchronization Number and Callback Time that corresponds to the requesting VOD System.

TABLE 1

| Element Name | Direction Flow | Required? | Element Value | Nested Elements? |
|---|---|---|---|---|
| VER1.0 | VODS ↔ ERS | No | Only one Ver1.0 element per ERSPayload element | Yes |
| ERSStatus | VODS ↔ ERS | No | Can have 0 . . . n of this element present | Yes |

The ERSPayload element has five attributes shown in Table 2. The ERSStatus element, in Table 2 above, would appear in a response from the ERS to VODS indicating to the VODS that the input XML transaction document was incomprehensible to the ERS. One or more ERS Status elements could appear in the response from ERS to VODS to adequately describe the exceptional error condition. Ver1.0 and ERSStatus are mutually exclusive.

TABLE 2

| Attribute Name | Direction Flow | Required? | Attribute Value |
|---|---|---|---|
| xmlns | VODS ↔ ERS | Yes | — |
| xmlns:xsi | VODS ↔ ERS | Yes | http://www.w3.org/2000/10/XMLSchema-instance |
| xsi:schemaLocation | VODS ↔ ERS | Yes | |
| payloadId | VODS ↔ ERS | No | String (25 character maximum) |

The xmlns attribute identifies the target namespace for the XML transaction document. ERS 104 echoes the same value (received from the VODS) for this attribute in the reply to VOD system 108. The xmlns:xsi attribute identifies the XML Schema instance namespace. ERS 104 echoes the same value (received from the VODS) for this attribute in the reply to VOD system 108. The xsi:schemaLocation attribute identifies the ERSPayload namespace and a URL path to an XML schema that defines ERSPayload. The ERS 104 will echo the same value (received from the VODS) for this attribute in the reply to VOD system 108. Note that there is an intentional space between value pairs for this attribute. The payloadId is an optional String attribute that allows VOD system 108 to insert a value for transaction tracking purposes. ERS 104 echoes the same value (received from the VODS) for this attribute in the reply to VOD system 108. The maximum length of this field is 25 characters.

The following table lists the elements of the Ver1.0 message element:

TABLE 3

| Element Name | Direction Flow | Required? | Element Value | Nested Elements? |
|---|---|---|---|---|
| Sender | VODS ↔ ERS | YES | No content. See Table 6 for attributes of the Sender element | No |
| ECMRequest | VODS → ERS | NO | Note: Can use this field to make eight or more ECMRequests | Yes |
| ECMResponse | ERS → VODS | No | Note up to eight or more ECMResponses may be received | Yes |
| ERSSynchNumber | ERS → VODS | Yes, if payload is OK | integer value from 0 to 255; value wraps back to 0 | No |
| CallbackTime | ERS → VODS | Yes, if payload is OK | UTC Time | No |
| ERSStatus | ERS → VODS | Yes, if an error occurred; No otherwise | Note: Can have more than one ERSStatus per ERSTransactionResponse message | No |

Presently, the ECMRequest element can be used up to eight times within the context of an ERSPayload/Ver1.0 message. Each ECMRequest element represents one ECM retrofit request for a single VOD title. When a request is unsuccessful, the ERSPayload/Ver1.0 message contains the appropriate error status messages using the ERSStatus element. A typical transaction error that might occur would be that the incorrect VODId was specified during a transaction request. The Ver1.0 element under the ERSPayload tag from the ERS 104 to the VODS may have one or more ECMResponses while the ERSSynchNumber and CallbackTime is included when the original payload message was successfully parsed.

ERSSynchNumber is an integer value from 0 to 255 (wraps back to 0) that indicates whether or not VOD system 108 needs to submit ECM retrofit requests for ECMs that have become outdated. VOD system 108 decides this by comparing the new ERSSynchNumber, received in the Ver1.0 response, to the one it is currently maintaining. If the one received is newer, then VOD system 108 must submit ECM retrofit requests for all titles associated with all previously maintained ERSSynchNumbers. CallbackTime informs VOD system 108 of the next time it should log into the ERS 104 to see if the VODS ERSSynchNumber has changed. CallbackTime is specified as Coordinated Universal Time (UTC). Note that the ERSSynchNumber and CallbackTime are returned only if the ERSPayload transaction request was successful. In other words, if VOD system 108 successfully logged into the ERS 104, then the ERSSynchNumber and CallbackTime are returned to VOD system 108. The Sender element has three attributes, defined in Table 4 below:

The following table lists the attributes of the Sender element:

TABLE 4

| Attribute Name | Direction Flow | Required? | Attribute Value |
|---|---|---|---|
| id | VODS ↔ ERS | Yes | string; "ers" reserved for the ERS |
| password | VODS ↔ ERS | Yes | string; password is "n/a" when sent from ERS to VODS |
| role | VODS ↔ ERS | Yes | Either "vods" or "ers" |

The id attribute uniquely identifies VOD system 108 to the ERS 104. This value is assigned to VOD Systems by the ERS 104 during VOD System enrollment. The value "1" identifies the ERS 104 and is sent in the id attribute in replies from the ERS 104 to VOD Systems. The password attribute corresponds to the id attribute and allows the VOD system 108 to log into the ERS 104 and submit ECM retrofit requests. This value is assigned to VOD Systems by the ERS 104 during VOD System enrollment. The value "n/a" is sent in the password attribute for replies from the ERS 104 to VOD Systems.

The role attribute indicates the role of the sender. For instance, if VOD system 108 sends ECM retrofitting requests to the ERS 104, the value for the role attribute is "vods". Conversely, if the ERS 104 sends a response to VOD system 108, then the value of the role attribute would be "ers".

The following table lists the elements of the ECMRequest element:

TABLE 5

| Element Name | Direction Flow | Required? | Element Value | Nested Elements? |
|---|---|---|---|---|
| EncryptionRecord | VODS → ERS | Yes | Only one per ECMRequest | Yes |

The body of the ECMRequest element consists of a single element called EncryptionRecord. The following table lists the elements contained in the EncryptionRecord element:

TABLE 6

| Element Name | Direction Flow | Required? | Element Value | Nested Elements? |
|---|---|---|---|---|
| TitleIdCode | VODS → ERS | No | String | No |
| ContentTitle | VODS → ERS | No | String | No |
| EncryptionTime | VODS → ERS | Yes | timeInstant | No |
| OLESId | VODS → ERS | Yes | long | No |
| Label | VODS → ERS | Yes | integer | No |
| EncryptionMode | VODS → ERS | Yes | integer | No |
| EncryptedDataVersion | VODS → ERS | Yes | integer | No |
| EncryptedDataBlock | VODS → ERS | Yes | Base64 encoded binary value | No |

Information Sent From ERS 104 to VOD System During Transaction Response

The ECMResponse element contains one ECMRecord and, optionally, an ERSStatus element when the ECM retrofit completes successfully for a given title. If the retrofit fails for a particular title, then an ECMResponse contains both the TitleIdCode (if provided in the ECM request) and ERSStatus elements. See Table 7 and Table 8 for more information on the contents of the ECMResponse element for successful and unsuccessful ECM retrofits. The following table lists the elements of the ECMResponse element when the transaction is successful:

TABLE 7

| Element Name | Direction Flow | Required? | Element Value | Nested Elements? |
|---|---|---|---|---|
| ECMRecord | ERS → VODS | Yes | Note: Only one per ECMResponse | Yes |
| ERSStatus | ERS → VODS | No | Note: May have more than one ERSStatus per ECMResponse | No |

The following table lists the elements of the ECMResponse element when the retrofit for a given title is unsuccessful:

TABLE 8

| Element Name | Direction Flow | Required? | Element Value | Nested Elements? |
|---|---|---|---|---|
| TitleIdCode | ERS → VODS | Yes, if provided in the original retrofit request | String | No |
| ERSStatus | ERS → VODS | Yes | Note: May have more than one ERSStatus per ECMResponse | No |

The following table lists the elements of the ECMRecord element:

TABLE 9

| Element Name | Direction Flow | Required? | Element Value | Nested Element? |
|---|---|---|---|---|
| TitleIdCode | ERS → VODS | Yes, if provided in the original retrofit request | String | No |
| ERSData | ERS → VODS | Yes | Note: Can have more than one ECMData field per ECMRecord | Yes |
| MinDelay | ERS → VODS | Yes | Time (00.sss) | No |

The TitleIdCode element uniquely identifies a vendor specific title identification code that was supplied in the ECM request. ECMData contains new ECM information that is to be inserted into the message streams by VOD system 108. Each Message inside ECMData is spaced apart in time from the previous message by at least the amount of time specified by MinDelay. The format for MinDelay is the following:

ss.sss 00.125 (i.e. 125 milliseconds)

The following table lists the elements of the ECMData element:

TABLE 10

| Element Name | Direction Flow | Required? | Element Value | Nested Elements? |
|---|---|---|---|---|
| Message | ERS → VODS | Yes | String containing Base64 encoded binary value | No |
| ProgramNumberOffset | ERS → VODS | Yes | Integer | No |

"Message" is a string containing a Base64 (RFC1341) encoded binary value of ECM information. This binary value is to be Base64 decoded and inserted into the ECM PID of the MPEG message stream. Specifically, each individual ECM of the set returned in the ECMResponse is inserted into the appropriate location of the ECM PID. The ProgramNumberOffset is an offset, specified in bytes, into Message after which a 16-bit Program Number is overwritten.

VOD System 108/ERS 104 Interface Protocol—Examples

Following are several examples of using VOD system 108/ERS 104 Interface Protocol XML schema to generate valid XML documents suitable for transactions.

ERS 104 Synchronization Number Request—Example

It should be observed that only the id and password need to be sent in an ERSPayload to retrieve the ERSSynchNumber and CallbackDatetime.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload ERSPayload.xsd" payloadId="1">
    <Ver1.0>
        <Sender id="vods5323523" password="VODPassword" role="vods"/>
    </Ver1.0>
</ERSPayload>
```

Successful ERS 104 Transaction Response—Example

This example is a typical ERS 104 transaction response. Note that the CallbackTime is specified as UTC.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload ERSPayload.xsd" payloadId="1">
    <Ver1.0>
        <Sender id="1" password="n/a" role="ers"/>
        <ERSSynchNumber>25</ERSSynchNumber>
        <CallbackTime>2000-07-10T01:15:00Z</CallbackTime>
    </Ver1.0>
</ERSPayload>
```

Successful ECM Request-Example

This example contains only one ECM request within the transaction, for one piece of content. However, multiple ECM requests may be made within a single ERSPayload.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload ERSPayload.xsd" payloadId="1">
    <Ver1.0>
        <Sender id="vods5323523" password="VODPassword" role="vods"/>
        <ECMRequest>
            <EncryptionRecord>
                <TitleIdCode>7820982</TitleIdCode>
                <ContentTitle>Top Gun</ContentTitle>
                <OLESId>83098224</OLESId>
                <EncryptionTime>2000-07-02T10:35:05Z</EncryptionTime>
                <EncryptionMode>123</EncryptionMode>
                <Label>7</Label>
                <EncryptedDataVersion>1</EncryptedDataVersion>
                <EncryptedDataBlock>j6lwxup4NbeVu8nk=</EncryptedDataBlock>
            </EncryptionRecord>
        </ECMRequest>
    </Ver1.0>
</ERSPayload>
```

Successful ECM Response-Example

This example is a typical response to the example request described in Section 0.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="1" password="n/a" role="ers"/>
        <ECMResponse>
            <ECMRecord>
                <TitleIdCode>7820982</TitleIdCode>
                <MinDelay>200</MinDelay>
                <ECMData>
```

Successful ECM Response-Example (continued)

```
                <Message>kn8uVebN4puMtK093lwu5bVkj6lxwvrkTlbn=</Message>
                <ProgramNumberOffset>128</ProgramNumberOffset>
            </ECMData>
            <ECMData>
                <Message>hn8uVebN4puMtK093lwu5bVkj6lxwvrkTlb6=</Message>
                <ProgramNumberOffset>128</ProgramNumberOffset>
            </ECMData>
            <ECMData>
                <Message>fn8uVebN4puMtM093lwu5bVkj6lxwvrkTlb0=</Message>
                <ProgramNumberOffset>128</ProgramNumberOffset>
            </ECMData>
        </ECMRecord>
    </ECMResponse>
    <ERSSynchNumber>26</ERSSynchNumber>
    <CallbackDatetime>2000-07-10T01:18:00Z</CallbackDatetime>
    </Ver1.0>
</ERSPayload>
```

ECM Request-Error Request Example

This example contains an ECM request within the transaction and is only intended to demonstrate an ERSPayload error with an invalid VODS Identifier.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="-1000" password="VODPassword" role="vods"/>
        <ECMRequest>
            <EncryptionRecord>
                <TitleIdCode>7820982</TitleIdCode>
                <ContentTitle>Top Gun</ContentTitle>
                <OLESId>83098224</OLESId>
                <EncryptionTime>2000-07-02T10:35:05Z</EncryptionTime>
                <EncryptionMode>123</EncryptionMode>
                <Label>7</Label>
                <EncryptedDataVersion>1</EncryptedDataVersion>
                <EncryptedDataBlock>j6lwxup4NbeVu8nk=</EncryptedDataBlock>
            </EncryptionRecord>
        </ECMRequest>
    </Ver1.0>
</ERSPayload>
```

ECM Response (unsuccessful ECM Request)-Example

This example is a typical error response which in this case, the ERS 104 determined that the VODSId was invalid.

```
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="1" password="n/a" role="ers"/>
        <ERSStatus statusNumber="1002" severity="error">
            <GeneralStatusText>The VOD System identifier, -1000, submitted in the id attribute of the Sender element was not recognized by the ERS.
            </GeneralStatusText>
            <ExtendedStatusData>-1000</ExtendedStatusData>
        </ERSStatus>
    </Ver1.0>
</ERSPayload>
```

ECM Request-Error ECMRequest Example

This example contains an ECMRequest within the transaction and is intended to demonstrate a problem with the ECMRequest.
```xml
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="vods5323523" password="VODPassword" role="vods"/>
        <ECMRequest>
            <EncryptionRecord>
                <TitleIdCode>7820982</TitleIdCode>
                <ContentTitle>Top Gun</ContentTitle>
                <OLESId>7878</OLESId>
                <EncryptionTime>2000-07-02T10:35:05Z</EncryptionTime>
                <EncryptionMode>123</EncryptionMode>
                <Label>7</Label>
                <EncryptedDataVersion>1</EncryptedDataVersion>
                <EncryptedDataBlock>j6lwxup4NbeVu8nk=</EncryptedDataBlock>
            </EncryptionRecord>
        </ECMRequest>
    </Ver1.0>
</ERSPayload>
```

ECM Request-Invalid EncryptionData Example

This example contains only one ECM request within the transaction, for one piece of content. In this example, the ERS 104 has determined that the EncryptionData inside the EncryptionRecord is invalid.
```xml
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="vods5323523" password="VODPassword" role="vods"/>
        <ECMRequest>
            <EncryptionRecord>
                <TitleIdCode>7820982</TitleIdCode>
                <ContentTitle>Top Gun</ContentTitle>
                <OLESId>83098224</OLESId>
                <EncryptionTime>2000-07-02T10:35:05Z</EncryptionTime>
                <EncryptionMode>123</EncryptionMode>
                <Label>7</Label>
                <EncryptedDataVersion>1</EncryptedDataVersion>
                <EncryptedDataBlock>j6lwxup4NbeVu8nk=</EncryptedDataBlock>
            </EncryptionRecord>
        </ECMRequest>
    </Ver1.0>
</ERSPayload>
```

Unsuccessful ECM Response-Invalid EncryptionData Example

This example is a typical error response to a request. In this case the ERS 104 has determined that the EncryptionData received in the request was invalid.
```xml
<?xml version="1.0" encoding='UTF-8'?>
<ERSPayload xmlns="http://www.motorola.com/namespaces/ERSPayload"
xmlns:xsi="http://www.w3.org/1999/XMLSchema-instance"
xsi:schemaLocation="http://www.motorola.com/namespaces/ERSPayload
http://www.motorola.com/namespaces/ERSPayload.xsd" payloadId="1">
    <Ver1.0>
        <Sender id="1" password="n/a" role="ers"/>
        <ECMResponse>
            <TitleIdCode>7820982</TitleIdCode>
            <ERSStatus statusNumber="5003" severity="error">
                <GeneralStatusText>The ERS has determined that the encryption data in the Encryption Record in the ECM Request was invalid.
                </GeneralStatusText>
```

| Unsuccessful ECM Response-Invalid EncryptionData Example |
|---|
| </ERSStatus>
    </ECMResponse>
    <ERSSynchNumber>26</ERSSynchNumber>
    <CallbackDatetime>2000-07-10T01:18:00Z</CallbackDatetime>
  </Ver1.0>
</ERSPayload> |

| XML Schema-VODS/ERS 104 Interface Protocol |
|---|
| ```xml
<?xml version="1.0" encoding="UTF-8"?>
<!-- edited with XML Spy v3.0 NT (http: www.xmlspy.com) at Motorola. Inc. -->
<!--W3C Schema generated by XML Spy v3.0 NT (http: www.xmlspy.com)-->
<!--  -->
<!--        Copyright(c) 2001 Motorola, Inc.    -->
<!--              All Rights Reserved           -->
<!--  -->
<!-- The following represent the content of transactions between the ERS and VOD Systems -->
<!--  -->
<!--    Protocol Versions currently supported: Ver1.0 -->
<!--  -->
>xsd:schema targetNamespace="http://motorola.motacc.net/namespaces/ERSPayload"
xmlns:xsd="http://www.w3.org/1999/XMLSchema"
xmlns:ers="http://motorola.motacc.net/namespaces/ERSPayload">
    <xsd:element name="ExtendedStatusData" type="xsd:string"/>
    <xsd:element name="GeneralStatusText" type="xsd:string"/>
    <xsd:element name="ERSStatus">
        <xsd:complexType>
            <xsd:sequence>
                <xsd:element ref="ers:GeneralStatusText"/>
                <xsd:element ref="ers:ExtendedStatusData" minOccurs="0"/>
            </xsd:sequence>
            <xsd:attribute name="statusNumber" type="xsd:integer" use="required"/>
            <xsd:attribute name="severity" use="required">
                <xsd:simpleType base="xsd:string" derivedBy="restriction">
                    <xsd:enumeration value="warning"/>
                    <xsd:enumeration value="error"/>
                </xsd:simpleType>
            </xsd:attribute>
        </xsd:complexType>
    </xsd:element>
    <xsd:element name="TitleIdCode" type="xsd:string"/>
    <xsd:element name="ContentTitle" type="xsd:string"/>
    <xsd:element name="OLESId" type="xsd:long"/>
    <xsd:element name="EncryptionTime" type="xsd:timeInstant"/>
    <xsd:element name="EncryptionMode" type="xsd:integer"/>
    <xsd:element name="Label" type="xsd:integer"/>
    <xsd:element name="EncryptedDataVersion" type="xsd:integer"/>
    <xsd:annotation>
        <xsd:documentation>
            Note that EncryptedDataBlock below is a Base64 encoding of a binary value
        </xsd:documentation>
    </xsd:annotation>
    <xsd:element name="EncryptedDataBlock" type="xsd:string"/>
    <xsd:element name="EncryptionRecord">
        <xsd:complexType>
            <xsd:sequence>
                <xsd:element ref="ers:TitleIdCode" minOccurs="0"/>
                <xsd:element ref="ers:ContentTitle" minOccurs="0"/>
                <xsd:element ref="ers:OLESId"/>
                <xsd:element ref="ers:EncryptionTime"/>
                <xsd:element ref="ers:EncryptionMode"/>
                <xsd:element ref="ers:Label"/>
                <xsd:element ref="ers:EncryptedDataVersion"/>
                <xsd:element ref="ers:EncryptedDataBlock"/>
            </xsd:sequence>
        </xsd:complexType>
    </xsd:element>
    <xsd:annotation>
        <xsd:documentation>
``` |

Message is a string containing a Base64 (RFC1341) encoded binary value of ECM information. This binary value will need to be Base64 decoded and inserted into the ECM PID of the MPEG message stream. Specifically, each individual ECM of the set returned in the ECMResponse must be inserted into the appropriate location of the ECM PID.

```
        </xsd:documentation>
    </xsd:annotation>
    <xsd:element name="Message" type="xsd string"/>
    <xsd:element name="ProgramNumberOffset" type="xsd:integer"/>
    <xsd:element name="ECMData">
        <xsd:complexType>
            <xsd:sequence>
                <xsd:element ref="ers:Message"/>
                <xsd:element ref="ers:ProgramNumberOffset"/>
            </xsd:sequence>
        </xsd:complexType>
    </xsd:element>
    <xsd:element name="MinDelay" type="xsd:integer"/>
    <xsd:element name="ECMRecord">
        <xsd:complexType>
            <xsd:annotation>
                <xsd:documentation>MinDelay is the number of milliseconds</xsd:documentation>
            </xsd:annotation>
            <xsd:sequence>
                <xsd:element ref="ers:TitleIdCode" minOccurs="0"/>
                <xsd:element ref="ers:MinDelay"/>
                <xsd:element ref="ers:ECMData" maxOccurs="unbounded"/>
            </xsd:sequence>
        </xsd:complexType>
    </xsd:element>
    <xsd:element name="ECMRequest">
        <xsd:complexType>
            <xsd:sequence>
                <xsd:element ref="ers:EncryptionRecord"/>
            </xsd:sequence>
        </xsd:complexType>
    </xsd:element>
    <xsd:group name="goodResp">
        <xsd:sequence>
            <xsd:element ref="ers:ECMRecord"/>
            <xsd:element ref="ers:ERSStatus" minOccurs="0" maxOccurs="unbounded"/>
        </xsd:sequence>
    </xsd:group>
    <xsd:element name="ECMResponse">
        <xsd:complexType>
            <xsd:choice>
                <xsd:sequence>
                    <xsd:element ref="ers:TitleIdCode" minOccurs="0"/>
                    <xsd:element ref="ers:ERSStatus" minOccurs="0" maxOccurs="unbounded"/>
                </xsd:sequence>
                <xsd:group ref="ers:goodResp"/>
            </xsd:choice>
        </xsd:complexType>
    </xsd:element>
    <xsd:element name="Sender">
        <xsd:complexType content="empty">
            <xsd:attribute name="id" type="xsd:string" use="required"/>
            <xsd:attribute name="password" type="xsd:string" use="required"/>
            <xsd:attribute name="role" use="required">
                <xsd:simpleType base="xsd:string" derivedBy="restriction">
                    <xsd:enumeration value="vods"/>
                    <xsd:enumeration value="ers"/>
                </xsd:simpleType>
            </xsd:attribute>
        </xsd:complexType>
    </xsd:element>
    <xsd:group name="respGroup">
        <xsd:sequence>
            <xsd:element ref="ers:ECMResponse" minOccurs="0" maxOccurs="8"/>
            <xsd:element name="ERSSynchNumber" type="xsd:unsignedByte" minOccurs="0"/>
            <xsd:element name="CallbackTime" type="xsd:timeInstant" minOccurs="0"/>
            <xsd:element ref="ers:ERSStatus" minOccurs="0" maxOccurs="unbounded"/>
        </xsd:sequence>
    </xsd:group>
```

-continued

```
<xsd:element name="Ver1.0">
    <xsd:complexType>
        <xsd:annotation>
            <xsd:documentation>
```

The following are the particles of ERSPayload under Ver1.0 and their requirements:

The Sender element has no particle children but has 3 attributes: id—identifier for the sending system password—corresponds to the id of the sending system, and role—this indicates "who" the sender is. this can either be only "vods" or "ers". The ECMRequest element contains a single request for a new ECM. One or more ECMRequests can be made per payload. The ECMResponse is analogous to the ECMRequest element in that it contains a single retrofitted ECM that corresponds to the original request. There can be up to 8 ECMResponses per payload. The ERSSynchNumber contains the most recent synchronization number from the ERS that corresponds to the requesting VOD System. The CallbackTime contains the next callback time that is uniquely assigned by the ERS for a particular VOD System. There cannot be ECMRequests and ECMResponses in the payload simultaneously.

ERSStatus contains error code responses from the ERS to VOD Systems. The particles of this element contain other elements that will give additional descriptive information describing the nature of the problem. Elements: GeneralStatusText—A short text summary that is uniquely associated with the statusNumber attribute. ExtendedStatusData—Optional element that contains the erroneous item relating to the status number given in attribute statusNumber. The ERSStatus tag has two attributes that are used for defining the exact reply status. They are: StatusNumber—A predefined four digit code assigned by the ERS. Four digits were chosen instead of three so that there would be no confusion between typical three digit HTTP response codes and codes defined by this protocol.

Severity—This attribute can have one of two possible values; Warning—a warning Indicates that something went wrong although ECM retrofits may have been successful. A full description of what went wrong will be provided in the GeneralStatusText element. An example of a warning may be an indication that an OLES is no longer defined and has become disassociated with the ERS. Error—Indicates a problem where an operation could not be completed. For example, a severe error would be the inability of the ERS to perform an ECM retrofit because supplied input information was either incorrect, incomplete, or corrupt. Note that ERSStatus may not be included in payload responses when the entire transaction is successful.

```
                </xsd:documentation>
            <xsd:annotation>
            <xsd:sequence>
                <xsd:element ref="ers:Sender"/>
                <xsd:choice>
                    <xsd:element ref="ers:ECMRequest" maxOccurs="8"/>
                    <xsd:group ref="ers:respGroup"/>
                </xsd:choice>
            </xsd:sequence>
        </xsd:complexType>
    </xsd:element>
    <xsd:element name="Ver2.0">
        <xsd:complexType>
            <xsd:sequence>
                <xsd:element ref="ers:Sender"/>
            </xsd:sequence>
        </xsd:complexType>
    </xsd:element>
    <xsd:element name="ERSPayload">
        <xsd:complexType>
            <xsd:annotation>
                <xsd:documentation>
                The ERSPayload supports several protocol versions through the use of particle children of the
                ERSPayload element. Currently, Ver1.0 is the only protocol version that is supported. The
                following are the attributes for the ERSPayload element:
                payloadId - Attribute that is optionally used by VOD Systems to track payload
                requests/responses.
                schemaLocation - This attribute is relevant to checking the validity of the document content, on
                a namespace by namespace basis. It contains pairs of values: The first member of each pair is
                the namespace for which the second member is the hint describing where to find to an
                appropriate schema document. The presence of these hints does not require the processor to
                obtain or use the cited schema documents, and the processor is free to use other schemas
                obtained by any suitable means, or to use no schema at all.
                NOTE: The Ver2.0 protocol version control element is included below for demonstration
                purposes to show future authors of this protocol where/how to begin writing the next protocol
                revision. It should be noted, however, that Ver2.0 is merely a place holder and could be
                changed to the next logical protocol version following Ver1.0 (e.g. Ver1_1_2).
                </xsd:documentation>
            </xsd:annotation>
```

-continued

```
        <xsd:choice>
            <xsd:element ref="ers:Ver1.0" minOccurs="0"/>
            <xsd:element ref="ers:Ver2.0" minOccurs="0"/>
        </xsd:choice>
        <xsd:attribute name="payloadId" type="xsd:string" use="optional"/>
        <xsd:attribute name="schemaLocation" type="xsd:uriReference" use="default"
                value="http://motorola.motacc.net/namespaces/ERSPayload
http://motorola.motacc.net/namespaces/ERSPayload.xsd"/>
        <xsd:attribute name="xmlns" type="xsd:uriReference" use="default"
                value="http://motorola.motacc.net/namespaces/ERSPayload"/>
        <xsd:attribute name="xsi" type="xsd:uriReference"
value="http://www.w3.org/1999/XMLSchema-instance"/>
        </xsd:complexType>
    </xsd:element>
</xsd:schema>
```

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A transaction protocol for communicating between an encryption renewal system communicably coupled to one or more video on demand systems via a communication network, the encryption renewal system permitting pre-encrypted content to be accessed by clients of the video on demand systems, the protocol comprising:

receiving, by the encryption renewal system, a request transaction document having a first format from the video on demand system;

parsing the request transaction document to retrieve data from the request transaction document;

generating a request object code having a second format for processing by encryption renewal system, the request object code based on the data in the request transaction document;

responsive to processing of the request object code, generating a response object code having the second format;

converting the response object code to a response transaction document having the first format; and forwarding the response transaction document to the video on demand system.

2. The protocol of claim 1 wherein the request transaction document contains an encryption record, a data structure having one or more cryptographic keys for accessing the pre-encrypted content.

3. The protocol of claim 1 further comprising parsing the request transaction document to determine a protocol version of the request transaction document, wherein the request object code is partly based on the protocol version.

4. The protocol of claim 1 wherein the first format is extensible mark-up language, and the second format is Java.

5. The protocol of claim 1 wherein the request transaction document is a request to retrofit an entitlement control message for permitting clients of the video on demand system to access the pre-encrypted content.

6. The protocol of claim 5 wherein the response transaction document is a response to the request to retrofit the entitlement control message.

7. The protocol of claim 6 wherein the response further comprises a callback time, specifying a time for the video on demand system to contact the encryption renewal system.

8. In a communication system having an encryption renewal system coupled to one or more on demand servers, a method by the encryption renewal system for allowing the on demand server to callback the encryption renewal system, the method comprising:

receiving a first request to retrofit an entitlement control message;

retrofitting the entitlement control message to allow access to pre-encrypted content;

generating a first response having the entitlement control message which is retrofitted, wherein the response further comprises a first call back time specifying a time for the video on demand system to contact the encryption renewal system;

receiving a second request to retrofit prior to the first callback time; and generating a response having a second callback time that invalidates the first callback time.

9. A system for communicating between an encryption renewal system communicably coupled to one or more video on demand systems via a communication network, the encryption renewal system permitting pre-encrypted content to be accessed by clients of the video on demand systems, the system comprising:

means for receiving a request transaction document having a first format from the video on demand system;

means for parsing the request transaction document to retrieve data from the request transaction document;

means for generating a request object code having a second format for processing by encryption renewal system, the request object code based on the data in the request transaction document;

responsive to processing of the request object code, means for generating a response object code having the second format;

means for converting the response object code to a response transaction document having the first format; and means for forwarding the response transaction document to the video on demand system.

10. The protocol of claim 9 wherein the request transaction document contains an encryption record, a data structure having one or more cryptographic keys for accessing the pre-encrypted content.

11. The protocol of claim 9 further comprising means for parsing the request transaction document to determine a protocol version of the request transaction document, wherein the request object code is partly based on the protocol version.

12. In a communication system having an encryption renewal system coupled to one or more on demand servers, a system for allowing the on demand server to callback the encryption renewal system, the system comprising:

means for receiving a first request to retrofit an entitlement control message;

means for retrofitting the entitlement control message to allow access to pre-encrypted content;

means for generating a first response having the entitlement control message which is retrofitted, wherein the response further comprises a first call back time specifying a time for the video on demand system to contact the encryption renewal systems;

means for receiving a second request to retrofit prior to the first callback time; and means for generating a response having a second callback time that invalidates the first callback time.

13. The protocol of claim 9 wherein the first format is extensible mark-up language, and the second format is Java.

14. The protocol of claim 9 wherein the request transaction document is a request to retrofit an entitlement control message for permitting clients of the video on demand system to access the pre-encrypted content.

15. The protocol of claim 14 wherein the response transaction document is a response to the request to retrofit the entitlement control message.

16. The protocol of claim 15 wherein the response further comprises a callback time, specifying a time for the video on demand system to contact the encryption renewal system.

* * * * *